United States Patent Office 3,321,449
Patented May 23, 1967

3,321,449
POLYBICYCLOARYLSULFONES
Herward A. Vogel, North St. Paul, Minn., assignor to Minnesota Mining and Manufacturing Company, St. Paul, Minn., a corporation of Delaware
No Drawing. Filed May 13, 1963, Ser. No. 280,091
9 Claims. (Cl. 260—79.3)

This invention relates to thermoplastic polymers and to processes for preparing same. More particularly, the invention is concerned with certain high molecular weight condensation polymers comprising polybicycloarylsulfones which are characterized by a high degree of thermal and chemical stability.

Polyphenylsulfones have been reported heretofore, as by Weil, Compt. Rend., 254, 3674 (1962), and as described by Kreuchunas in U.S. Patent No. 2,822,351. However, these have been either insoluble or low molecular weight materials which were not suitable for the production of shaped articles; or have been of little practical use because they have been susceptible to chemical oxidation and the like. Moreover, the heretofore available processes have failed to permit the preparation of polymers of this type which form films or filaments of good physical properties.

It has now been found that certain very useful, soluble, high molecular weight, film-forming polybicycloaryl sulfones can be produced from bicycloaromatic disulfonylchlorides by condensation with bicyclic aromatic hydrocarbons, or by self-condensation of certain bicycloaromatic monosulfonyl chlorides. While it was known in the art that the interaction of a sulfony halide with an aromatic hydrocarbon in the presence of a Friedel-Crafts catalyst results in the formation of an aromatic sulfone, I believe I am the first to have prepared the novel high molecular weight film and fiber-forming polymers of this invention via this reaction.

It is an object of this invention to provide certain novel high molecular weight condensation polymers which are wholly aromatic in character and which contain bicyclic aromatic sulfone groups in the recurring units of the polymeric chain.

It is another object of this invention to provide soluble, thermoplastic materials comprising polybicycloarylsulfones which are characterized by a high level of thermal and chemical stability, and by their useful solubility and film-forming properties.

It is still another object of the invention to provide self-supporting films of polybicycloarylsulfones which have useful dielectric properties.

In accordance with the above and other objects of the invention, I have prepared linear condensation polymers consisting essentially of repeating units having the formula $$\pm SO_2—R—SO_2R'\pm$$

wherein R and R' are aromatic linking groups of the class consisting of

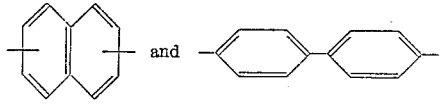

i.e., naphthylene and biphenylene groups.

These polymers are of high molecular weight, and form strong orientable films and filaments of excellent physical properties. They can be molded, extruded, drawn, oriented or otherwise formed into articles by conventional methods used to shape thermoplastic resins, without serious degradation; and the articles thus produced have useful strength, toughness, flexibility and good appearance. They have excellent dielectric properties and retain these properties at high temperatures.

The polymers of the invention are thermoplastic and soften at relatively high temperatures. They melt at temperatures ranging from the order of 300° C. to over 450° C. They are stable, and can withstand temperatures of 400° C. or even higher without serious degradation.

The polymers of the invention are soluble in concentration of 10% in phenol at 175° C., which indicates their substantially linear, non-cross-linked nature. They are also soluble in concentrated sulphuric acid and in N-methyl pyrrolidnone, producing stable solutions. The polymers are also soluble to some extent in such solvents as N,N-dimethyl acetamide, dimethyl sulfoxide and the like. The solutions which result are, in some instances (e.g. where the solvent is easily removed), useful for casting of films and spinning of fibers.

The stability of the polymers includes resistance to hydrolytic and oxidizing media. Thus, for example, the polymers may be recovered unchanged from their solution in concentrated sulphuric acid merely by dilution with water. Likewise, they can be heated under pressure in the presence of aqueous acids or bases without hydrolysis.

The toughness of thermoplastic materials is known to be an index of their utility for use as films or molded items. Toughness as a property can be measured by subjecting a film of polymer from 3 to 7 mils thick to repeated creasing by folding a strip of the film double and creasing, followed by refolding the film back upon itself on the same line and again creasing, as one cycle. The number of creasing cycles withstood by the film before breaking at the crease line is referred to as the "degree of toughness." Failure to withstand the initial creasing rates a degree of toughness of zero; if the film breaks on the second cycle, the degree of toughness is one, etc.

The heat resistance of a polymer can be determined by thermogravimetric analysis (often abbreviated TGA), i.e., measuring the loss and weight of the polymer while heating to high temperature. For example, a useful test is provided by simultaneously heating up and weighing a 100 mg. sample of the polymer in a suitable oven, in air, from ambient temperature to about 400–500° C., at the rate of 7° C. temperature increase per minute, to determine any weight loss. A weight loss of 5 percent or less in this test shows excellent stability and oxidative resistance of the polymer at the highest temperature used.

The polymers of the invention have various uses in numerous areas of application. They can be used to make films and fibers or molded articles in any desired shape, either alone or mixed with fllers, glass fibers and the like. They are usefully laminated with glass fibers or glass cloth. They can also be used as adhesives or coatings, to impregnate the surface of various materials or to form a surface film thereon. They are useful as wire coatings, tubes, pipes, sheets and the like.

The polymers are particularly useful in applications where their high dielectric properties are of importance, as in electrical insulating materials, and particularly where severe and corrosive ambient conditions are found.

One process for producing the polymers in accordance with the invention consists in the condensation of certain monomers containing sulfone groups, with other monomers having aryl nuclei, in the presence of certain catalysts. The monomeric materials which are starting compounds for the reaction can be considered to be difunctional, so that two reactive centers are present. In carrying out the reaction, each halogen on the aromatic sulfonyl chloride grouping reacts with a hydrogen atom of the aromatic nucleus. The reaction is more specifically illustrated by the following series of equations:

(I)

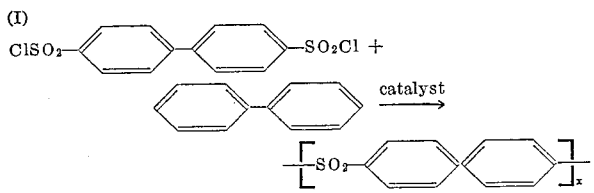

Chains of various lengths are formed, as is known to occur in polymerization; and $x$ is a number which is an average of the number of repeating units in these chains. In the case of the higher molecular weight polymers, $x$ is from about 50 to 250 or more.

When naphthalene is used as the comonomer instead of biphenyl, a copolymer is formed; and such copolymers are included within the scope of the invention. In this reaction, it will be apparent that copolymers with equimolar ratio of monomers are obtained.

Another type of condensation which produces the polymers of the invention, employing monomers which are self-condensable, is illustrated by the following reaction:

(II)

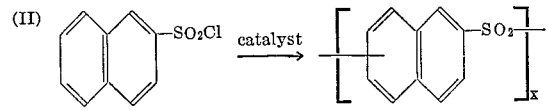

When copolymers are desired, mixtures of the monomers are used:

(III)

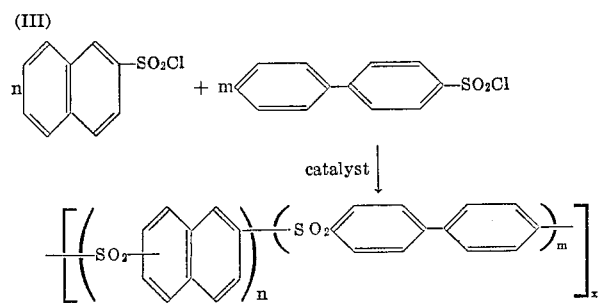

In the case of copolymers prepared by this method, the relative amount of $n$ and $m$, which are integral numbers, governs the composition of the final copolymer chain. The monomer groups will be distributed randomly along the chain, but with the approximate ratio of groups present in each chain as was present in the initial mixture.

Comonomers useful in reactions of type I are exemplified by biphenyl and the corresponding p,p'-disulfonyl chloride, and naphthalene and corresponding disulfonyl chloride derivatives.

Monomers of the type useful in the process as illustrated by reactions II and III are, of course, biphenylsulfonyl chloride and naphthylsulfonyl chloride.

The deactivating effect of the sulfonyl group on the aromatic ring to which it is or becomes attached is sufficient to prevent any significant amount of higher than monosulfone formation on any one ring. Branching and cross-linking are thus suppressed, and accordingly the polymers of the invention are substantially linear. By heating at temperatures below their melting point (i.e. annealing), or by orienting, they may acquire more or less crystallinity.

Any of the above monomers or comonomers can be further substituted with small non-reactive substituents on the aromatic nuclei. Thus, the aromatic nuclei may additionally bear alkyl and perfluoroalkyl groups such as methyl, ethyl, propyl, hexyl and the like; lower alkoxy groups such as methoxy, ethoxy, butoxy, etc.; halogen atoms such as chlorine or bromine, or other similar small substituents which are inert under the conditions of the poly condensation reaction.

The processes of this invention broadly speaking are carried out utilizing either melt-condensation or solution-condensation procedures, involving the repeated reaction between an aromatic sulfonyl chloride group and an aromatic hydrogen atom in the presence of a condensation catalyst.

It is generally preferred to utilize an inert solvent in carrying out the polymerization process in order to increase the fluidity of the reaction mixture. The preferred solvents are chlorinated aliphatic and aromatic hydrocarbons, e.g. s-tetrachloroethane, methylene chloride, and Arochlors (highly chlorinated biphenyl and diphenyl ether), etc. or aliphatic and aromatic sulfones such as dimethyl sulfone, tetramethylene sulfone, p,p'-dichlorodiphenylsulfone, etc., or aliphatic and aromatic nitro compounds, such as 1-nitropropane, nitrobenzene, 3,4'-dichloronitrobenzene, etc.

Effective condensation catalysts are anhydrous Lewis acids, also known as Fridel-Crafts catalysts, such as ferric chloride, aluminum chloride, zinc chloride, the chlorides of antimony, etc. Anhydrous hydrofluoric acid, or trifluoromethane sulfonic acid also may be used as catalysts.

The particularly preferred catalysts are salts and oxides of iron, such as ferric chloride, ferric bromide, ferric fluoride and ferric oxide. Ferrous chloride, ferric sulfate, ferroso-ferric oxide and the like also can be effectively utilized as catalysts because these compounds are converted into ferric chloride by reaction with the sulfonylchloride monomer under the conditions of the polymerization.

The preferred catalysts are generally found to be effective in amount of from about 0.05 to about 0.5 mole percent, based on the amount of monomer present. Greater proportions of catalyst may be utilized but this is generally unnecessary and is ordinarily avoided, because larger amounts can adversely affect the degree of polymerization and the separation of the catalyst from the polymer may prove difficult.

To effect the polycondensation the monomers or co-monomers are generally first heated in the presence of an inert solvent to a temparture sufficient to obtain a uniform melt. Commonly this is achieved at a temperature ranging from 100 to 200° C., although temperatures ranging from about 25° to 250° may be used. After a uniform melt is obtained, the condensation catalyst is added and the mixture is maintained at a temperature in the range of from 100° to 250° C. for from about one hour to twenty hours, to complete the polymerization. High molecular weight polybicycloarylsulfones are produced in high yields in this manner as is shown by the examples which follow.

The following examples are intended to illustrate the present invention, but no limitations to the scope of the invention are implied. All parts are by weight, unless otherwise specified. Inherent viscosities of the polymers are determined in accordance with the following equation:

$$\eta_{inh} = \frac{\ln \eta_{rel}}{C}$$

The relative viscosity ($\eta_{rel}$) is determined by dividing the flow time in a capillary viscometer of a dilute solution of the polymer by the flow time for the pure solvent. The concentration (C) is 1.0 gram of polymer per 100 ml. of solvent, and the measurements are made at a temperature of 25° C. in solution in a mixture of 60 g. of phenol and 40 g. of s-tetrachloroethane unless otherwise noted.

*Example 1*

A mixture of 25 g. of 4-biphenyl sulfonylchloride and 20 g. of Arochlor 1248 (50% chlorinated biphenyl) was heated in a 100 ml. flask to about 160° C. After a uniform melt had formed, 20 mg. of sublimed ferric chloride were added and heating was continued for 20 hours at temperatures gradually rising to 230° C. The hydrogen chloride gas evolved during the polymerization was eliminated by a slow stream of nitrogen leading to a water trap. The reaction product was ground and dissolved in 200 g. of hot phenol. The solution was filtered and poured into a mixture of 2 parts of hot dimethylacetamide and 1 part of methanol. The poly(biphenyl sulfone) separated as a crystalline precipitate. It was recovered by filtration, washed carefully with methanol and hot water containing a small amount of hydrochloric acid and dried. The polymer showed a melting range of 410–430° C. and an inherent viscosity of 0.18 as a 1% concentrated solution in a mixture of 60 g. phenol and 40 g. s-tetrachloroethane. The poly(biphenyl sulfone) thus obtained is slightly yellowish to colorless and is soluble in phenol and pyrrolidone.

By purifying the starting materials, as by recrystallization, and continuing heating of the polymerization mixture for longer periods of time, higher molecular weights are achieved. Polymers having inherent viscosities of the order of 0.3 give tough flexible films.

Films pressed from the polymer by heating and subsequent quenching with cold water are transparent. They have good dielectric properties and can be used as electrically insulating sheets.

*Example 2*

A mixture of 50 g. of 2-naphthalene sulfonylchloride and 30 g. of dimethylsulfone was heated to 150° to form a uniform melt. Then 50 mg. of sublimed ferric chloride were added and the heating was continued for 5 hours at temperatures rising from 150° to 190° and for 15 hours at 200° C. The product was allowed to cool, ground into a fine powder, extracted twice for several hours with boiling water to remove the dimethyl sulfone solvent, and dried. The poly(naphthalene sulfone) thus obtained showed a melting range of 290–310° C. and an inherent viscosity of 0.18 in a 1% concentrated solution in a mixture of 60 g. of phenol and 40 g. s-tetrachloroethane. The polymer is slightly yellowish and is soluble in dimethyl sulfoxide, N-methyl pyrrolidone and phenol. Transparent films can be obtained by solvent casting or hot pressing.

*Example 3*

A mixture of 16.6 g. of 2,7-naphthalene disulfonyl chloride, 7.7 g. of biphenyl and 18 g. of Arochlor 1248 (50% chlorinated biphenyl) was heated in a flask to 160°. After a uniform melt had formed 30 mg. of sublimed ferric chloride were added and heating was continued for 3 hours at temperatures rising from 160 to 220° C. and for 12 hours at 230° C. The product was allowed to cool, ground up and dissolved in 200 g. of hot phenol. The solution was poured into a mixture of 2 parts of dimethyl formamide and 1 part of methanol. The poly(naphthalene-biphenyl) sulfone copolymer separated as a crystalline precipitate. It was recovered by filtration, washed carefully with methanol and hot water containing a small amount of hydrochloric acid and dried. The polymer showed a melting range of 330–350° C. and an inherent viscosity of 0.20 as a 1% concentrated solution in a mixture of 60 g. of phenol and 40 g. of s-tetrachloroethane. The polymer is colorless to somewhat yellow and is soluble in dimethylsulfoxide, phenol and M-methyl pyrrolidone.

Copolymers made by the above process, but using mixtures of biphenyl sulfonylchloride and 2-napthalene sulfonylchloride produce copolymers with varying numbers of naphthyl and biphenyl groups in the chain.

Molding powders are readily prepared by grinding the polymers of the invention to the desired state of division. The powders thus obtained can be molded in heated molds at temperatures somewhat above the melting point and employing pressure as required, these methods being well-known to the art. If desired, adjuvants or additives can be incorporated into the molding powders, such as fillers, dyes, plasticizers and the like. The powders can be pelletized, if desired, to produce more easily handled, uniform pellets or granules.

The molded articles made from the polymers of the invention are strong and dimensionally stable, and, depending on the nature of the additives, if any, retain their good dielectric properties.

Fibers are conveniently prepared from the polymers by conventional methods. Thus, for example, a solution of the selected polymer in a solvent, preferably a solvent having moderately high vapor pressure, is extruded through a die or spinneret into a stack, where the solvent is evaporated. Remaining traces of solvent may be washed out of the fiber, if desired. Alternatively, the polymer can be melted and fibers drawn directly from a molten pool. Extrusion of fibers or filaments from the melt through a spinneret is more successful where large denier filaments are to be produced. Dyes, or viscosity lowering agents, can be incorporated into the polymer before extrusion.

The fibers thus produced can be drawn over a hot pin to orient them, with a resulting increase in strength and the development of crystallinity.

What is claimed is:

1. A substantially linear, soluble, film-forming condensation polymer consisting essentially of repeating units of the formula:

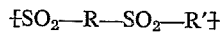

wherein R and R' are aromatic linking groups of the class consisting of

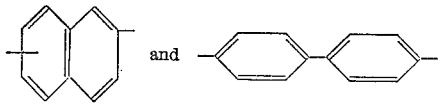

2. A substantially linear, soluble, film-forming condensation polymer consisting essentially of repeating units of the formula:

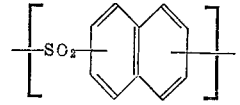

3. A substantially linear, soluble, film-forming condensation polymer consisting essentially of repeating units of the formula:

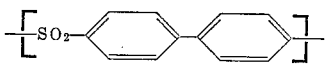

4. A substantially linear, soluble, film-forming condensation copolymer consisting essentially of repeating units of the formula:

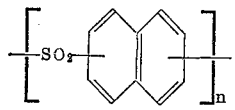

and

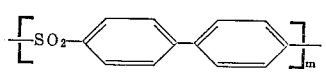

wherein $n$ and $m$ are present in integral numerical amounts.

5. Poly(biphenylsulfone) capable of forming a self-supporting film.

6. Poly(naphthylsulfone) capable of forming a self-supporting film.

7. A self-supporting film of a condensation polymer consisting essentially of repeating units of the formula:

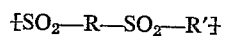

wherein R and R' are aromatic linking groups of the class consisting of

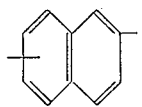 and 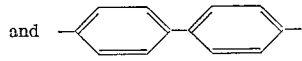

8. A molding powder of a condensation polymer consisting essentially of repeating units of the formula:

$$\text{\textlbrackdbl}SO_2-R-SO_2-R'\text{\textrbrackdbl}$$

wherein R and R' are aromatic linking groups of the class consisting of

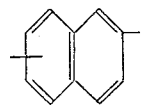 and 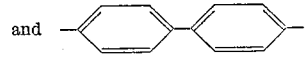

9. A fiber of a condensation polymer consisting essentially of repeating units of the formula:

$$\text{\textlbrackdbl}SO_2-R-SO_2-R'\text{\textrbrackdbl}$$

wherein R and R' are aromatic linking groups of the class consisting of

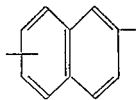 and 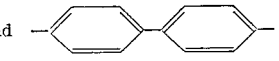

No references cited.

JOSEPH L. SCHOFER, *Primary Examiner.*

D. K. DENENBERG, *Assistant Examiner.*

Notice of Adverse Decisions in Interferences

In Interference No. 96,500 involving Patent No. 3,321,449, H. A. Vogel, POLYBICYCLOARYLSULFONES, final judgment adverse to the patentee was rendered Nov. 24, 1971, as to claims 1 to 9.

[*Official Gazette March 6, 1973.*]